United States Patent [19]

Stein

[11] Patent Number: 5,308,161

[45] Date of Patent: May 3, 1994

[54] PYROMETER APPARATUS FOR USE IN RAPID THERMAL PROCESSING OF SEMICONDUCTOR WAFERS

[75] Inventor: Alexander Stein, Secaucus, N.J.

[73] Assignee: Quantum Logic Corporation, East Norwalk, Conn.

[21] Appl. No.: 16,713

[22] Filed: Feb. 11, 1993

[51] Int. Cl.$^5$ .................. G01J 5/10; G01N 25/20; H05B 3/62

[52] U.S. Cl. ................... 374/5; 250/227.14; 250/341; 362/268; 374/9; 374/126; 392/416

[58] Field of Search ................ 374/5, 126, 131, 130, 374/9; 364/557; 219/405, 416, 492.1; 250/571, 341; 362/268; 324/158 R

[56] References Cited

U.S. PATENT DOCUMENTS

| | | | |
|---|---|---|---|
| 3,586,851 | 6/1971 | Rudolph | 362/268 X |
| 4,222,663 | 9/1980 | Gebhart et al. | 356/45 |
| 4,579,461 | 4/1986 | Rudolph | 250/571 X |
| 4,745,291 | 5/1988 | Niiya | 374/5 X |
| 4,797,134 | 12/1990 | Arima et al. | 374/126 X |
| 4,919,542 | 4/1990 | Nulman et al. | 374/9 |
| 5,154,512 | 10/1992 | Schietinger et al. | 374/9 X |

OTHER PUBLICATIONS

"New Ways to Improve RTP Through Optical Fiber Thermometry," dated Apr. 11, 1989, six pages, Accu-Fiber, Inc.

Primary Examiner—Daniel M. Yasich

[57] ABSTRACT

Pyrometer apparatus measures the temperature of a semiconductor wafer which when heated by radiation from a bank of lamps emits thermal radiation which includes radiation contained in a selected spectral band. The apparatus includes a reaction chamber supporting the wafer and disposed above the bank of lamps. A hollow envelope reflecting incident radiation and thermal radiation from the wafer surrounds and is spaced from the chamber and the bank of lamps. A portion of the reflected radiation and the thermal radiation passes upwardly through a first opening. A source of said incident radiation disposed adjacent a second opening produces radiation within said spectral band which enters said envelope and is reflected inside the envelope to illuminate a selected spot on the wafer hemispherically. The spot reflects a portion of the incident radiation upwardly through the first opening. A device disposed outside of said envelope adjacent and above the first opening in the path of the reflected portion of incident radiation and said upward portion of wafer thermal radiation and responds within said spectral band to both of said portions to produce a first electrical signal proportional to the said reflected portion of incident radiation and a second electrical signal proportional to said upward portion of wafer thermal radiation. Another device responds to the first and second electrical signals to calculate the temperature of the wafer.

6 Claims, 1 Drawing Sheet

PYROMETER APPARATUS FOR USE IN RAPID THERMAL PROCESSING OF SEMICONDUCTOR WAFERS

BACKGROUND OF THE INVENTION

Semiconductor wafers are conventionally processed in batch type furnaces. In order to obtain higher resolution, a new process, known as rapid thermal processing, is steadily replacing batch furnace processing. In this process, a semiconductor wafer is heated by a bank of quartz lamps. The temperature of the wafer must be accurately measured, because inaccurate measurements can result in ineffficent or even faulty processing.

The present invention is directed toward both a new and highly accurate method for measuring such temperatures and to new and improved apparatus for use in measuring such temperatures.

SUMMARY OF THE INVENTION

In accordance with the principles of this invention, a semiconductor wafer is supported in a reaction chamber. A bank of lamps is disposed in the chamber below the wafer and heats the wafer to a temperature to be measured. When the wafer is heated, it emits thermal radiation. The chamber is transparent to a spectral portion of this thermal radiation. The lamps also emit thermal radiation within the same band, but are shielded so that a selected narrow spectral portion of the lamp thermal emission is suppressed.

A hollow envelope adapted to reflect incident radiation within this selected spectral band surrounds and is spaced from the chamber and the bank of lamps. The envelope has a first opening disposed above the wafer and a second opening spaced from the first opening. A portion of the wafer radiation passes upwardly through the first opening and is filtered to pass only that energy which falls within the selected spectral band.

A source which emits radiation within the selected spectral band is disposed adjacent the second opening. Radiation from the source enters said envelope and is reflected inside the envelope to illuminate a selected spot on the wafer hemispherically. The spot reflects a portion of the incident radiation upwardly through the first opening;

The reflected portion of incident radiation and the upward portion of wafer radiation pass upwardly through the first opening in the envelope. In response to the reflected portion of incident radiation, a first electrical signal $V/o$ is produced which is proportional thereto. In response to the spectrally selected, upward portion of wafer thermal radiation, a second electrical signal $V/i$ is produced which is proportional thereto.

The first and second electrical signals, with the assistance of certain known equations, are processed to calculate the temperature of the wafer.

The first equation is that of Planck wherein the calculated wafer emissivity within the specified spectral band is a specified function of the first electrical signal.

The second equation defines the effective wafer emissivity as a specified function of the calculated wafer emissivity.

The third equation defines the calculated wafer emissivity as equal to the quantity 1 minus the directional hemispherical reflectance of the wafer.

The fourth equation defines the second electrical signal as proportional to the directional hemispherical reflectance of the wafer.

These four equations and the first and second signals are utilized to compute the wafer temperature in the following manner.

It is known that the first signal $V/o$, in accordance with the Planck equation, is equal to the quantity $a.E.2ch^2 L^{-5}[\exp(hc/Lkt)-1]^{-1}$ where E is the wafer emissivity of a free standing wafer at the wavelengths of operation [ie, the specified spectral band]; h is Planck's constant; c is the velocity of light in a vacuum; k is Boltzmann's constant; T is the temperature of the wafer in degrees Kelvin; and a is a known instrument constant. The value of E is uncertain and is generally the largest source of errors in measuring temperature using this equation.

In particular, since the wafer is disposed within a reflective enclosure, some of the thermal radiation is reflected back and forth before a portion exits from the first opening. As a result, this portion of the radiation is larger than it would have been had the wafer be free standing.

However, if the value of the emissivity E is changed to provide a suitable corrected value, an effective emissivity, and this corrected value is substituted for the uncorrected value in the Planck equation, the temperature can be computed accurately.

The effective emissivity value $E/f$ is equal to a function $f[E/o]$ of the emissivity $E/o$ of the wafer material and the system geometry. This is the second equation $E/f = f[E/o$. It is known that for any particular system, the value of $E/f$ is greater than the value of $E/o$ and less than 1. In order to compute $E/f$. it is first necessary to measure the value of $E/o$.

It is well known that the emissivity $E/o$ of an opaque body such as the wafer material employed herein, as measured in the direction of observation, is defined by an equation, $E/o = 1 - R/h$, where $R/h$ is the directional hemispherical reflectance of the body. This is the third equation. $R/h$ is the energy [normalized to the incident energy], reflected in a selected direction when the body is illuminated hemispherically from that direction.

This reflectance, $R/h$ is defined by the fourth equation $R/h = b V/i$, where b is a second known instrument constant and $V/i$ is the second electrical signal.

In order to measure the temperature using the signals $V/o$ and $Vi$, the fourth equation is used to calculate the value of the reflectance $R/h$. Then the third equation is used to calculate the value of $E/o$.

The value of the function $f[e/o]$ is determined experimentally by placing targets of known and different emissivities in place of the wafer and maintaining these targets at a known temperature. By using the Planck equation and measuring the signal $V/o$, the value of $f\{E/o]$ can be determined by the first equation.

The second equation is then used to compute the value of the effective emissivity $E/f$. $E/f$ is then substituted for the value of E for a free standing wafer in the first equation. The desired value of the temperature T can then be calculated by solving this equation.

DETAILED DESCRIPTION OF PREFERRED EMBODIMENTS

Figure 1:
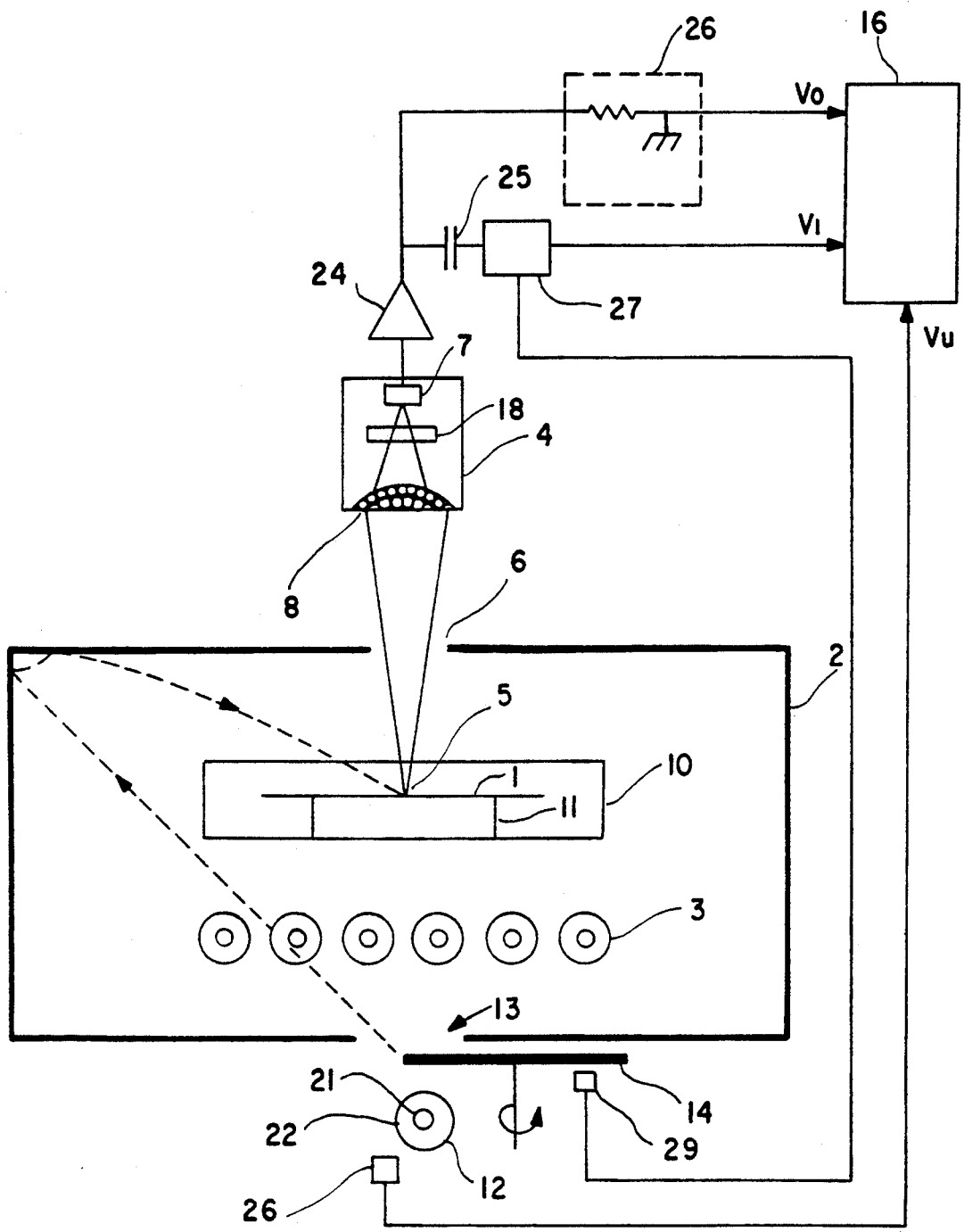
FIG. 1 illustrates a preferred embodiment of the invention.

Referring now to FIG. 1, a silicon wafer 1 is disposed on support 11 within a reaction chamber 10 and is heated therein by a bank of quartz lamps 3. Chamber 10 can be made of water-free quartz and is normally filled with purge gas or a gaseous reactant. In order to avoid interference from radiation in a selected specific spectral band [in this example, a narrow spectral band centered about 2.7 um] from the lamps, various methods can be used. In one known method, the quartz lamps utilize envelopes made of hydroxylated quartz which eliminates this spectral band from the lamp spectrum. The chamber transmits the lamp radiation and also transmits the radiation in this spectral band. As will be explained hereinafter, the wafer radiation through the walls of the chamber can be measured at this spectral band without being influenced by lamp radiation.

The chamber 10 is disposed within a reflecting envelope 2 which reflects radiation within the spectral band. The envelope has a first opening 6 and a second opening 13. While these openings are shown as oppositely disposed, they need not be opposite, but must be spaced from each other.

A radiation source 12 is disposed below the second opening and emits radiation which enters envelope 2 via opening 13 and after being reflected within the envelope, illuminates a spot 5 on the wafer hemispherically. Source 12 can be an electrically heated graphite tube 21 mounted inside a tubular jacket 22 made from water-free quartz. The annular region between the tube and the jacket can be filled with an inert gas such as nitrogen to prevent the graphite from buring.

A known sensor head 4 is disposed vertically above the first opening 6. [An example of a know head is model QL3200 manufactured and sold by Quantum Logic Corporation.] This head includes a lens 8, a photodetector 7 and a filter 18. Lens 8 intercepts and focuses the portion of radiation emitted from spot 5 and passing through the opening onto photodetector 7. Filter 18 is disposed between the lens 8 and the photodetector. The filter passes only such radiation as falls within the selected spectral band. An operational amplifier 24 receives the resultant photo currents and converts them into proportional voltage signals.

The radiation passing through opening 6 has two components. The first component is a portion of the reflected injected radiation while the second component is a portion of the wafer thermal radiation.

The first signal V/i is derived from the first component, while the second signal V/o is derived from the second component. Therefore, it is necessary to separate these components for individual processing. The photodetector, typically an InAs detector, responds to both components.

The thermal radiation has a relatively constant value and causes the detector 7 to produce a direct photo current. This direct current is converted to a direct voltage by the amplifier 24. This voltage, after passing through a resistance-capacitance network 26 in order to remove any alternating current component, is supplied as signal V/o to an input of computer 16.

The reflected radiation is modulated to enable it to be distinguished from the thermal radiation. A commercially available mechanical interrupter or chopper 14 is disposed between source 12 and opening 13 to modulate the radiation from the source 12 before it enters the envelope so that the detector 7 yields an alternating photo current derived from the modulated radiation The amplifier yields both a direct current and an alternating current. The alternating current, blocked by the network 26, passes through capacitor 25 [which blocks any direct current component] to sample-and-hold circuit 27. The output from circuit 27 is supplied as signal V/i to another input of computer 16. The circuit 27 must be synchronized with the modulated signal so that it responds only to the modulated signal. In order to carry out the synchronization, an optical pick-up module 29 is placed at the chopper wheel and generates a synchronizing or timing signal which is supplied to the circuit 27.

The computer has the four equations and various instrument constants stored therein and performs the calculations previously described to obtain the temperature.

In cases where the brightness of source 12 is subject to change, a radiance monitor 20 responding to the radiation emitted from the source can produce an electrical signal V/ii which is fed to the computer to normalize signal Vi.

While the invention has been described with particular reference to a preferred embodiment, the protection sought is to be limited only by the terms of the claims which follow.

What is claimed is:

1. Pyrometer apparatus for measuring the temperature of a semiconductor wafer which when heated by radiation from a bank of lamps emits thermal radiation which includes radiation contained in a selected spectral band, said apparatus comprising:
   a reaction chamber supporting the wafer and disposed above the bank of lamps, the chamber being transparent to the thermal radiation from the lamp bank and from the wafer, that portion of the radiation from said bank which is contained in a selected spectral band being suppressed before impinging upon the chamber;
   a hollow envelope reflecting incident radiation and thermal radiation from the wafer which surrounds and is spaced from the chamber and the bank of lamps, the envelope having a first opening disposed above the wafer and a second opening spaced from the first opening, a portion of the reflected radiation and the thermal radiation passing upwardly through the first opening;
   a source of said incident radiation disposed adjacent the second opening for producing radiation within said spectral band which enters said envelope and is reflected inside the envelope to illuminate a selected spot on the wafer hemispherically, said spot reflecting a portion of the incident radiation upwardly through the first opening;
   first means disposed outside of said envelope adjacent and above the first opening in the path of the reflected portion of incident radiation and said upward portion of wafer thermal radiation and responsive within said spectral band to both of said portions to produce a first electrical signal proportional to the said reflected portion of incident radiation and a second electrical signal proportional to said upward portion of wafer thermal radiation; and
   second means responsive to the first and second electrical signals to calculate the temperature of the wafer.

2. The apparatus of claim 1 wherein the second means includes a microprocessor having stored therein the following equations:
1. Planck's formula wherein the calculated wafer emissivity at the wavelengths of operation is a specified function of the second electrical signal;
2. a second formula defining the effective wafer emissivity as a specified function of the calculated wafer emissivity;
3. a third formula defining the calculated wafer emissivity as equal to the quantity 1 minus the directional hemispherical reflectance of the wafer; and
4. a fourth formula defining the first electrical signal as proportional to the directional hemispherical reflectance of the wafer, the microprocessor responding to the first and second signals and utilizing the stored formulae to calculate the wafer temperature.

3. The apparatus of claim 2 wherein the first signal is modulated.

4. The apparatus of claim 3 wherein the second signal is essentially constant.

5. The apparatus of claim 4 wherein the first means includes a lens and a photodetector, the lens intercepting the radiation passing upward through the first opening and focusing the intercepted radiation onto the photodector.

6. The apparatus of claim 5 wherein the first means also includes a filter disposed between lens and the photodetector and passing only such radiation as falls within the selected spectral band.

* * * * *